(12) United States Patent
Ikonen et al.

(10) Patent No.: US 9,422,134 B2
(45) Date of Patent: Aug. 23, 2016

(54) ROPE TERMINAL ASSEMBLY AND AN ELEVATOR

(71) Applicant: KONE Corporation, Helsinki (FI)

(72) Inventors: Antti Ikonen, Helsinki (FI); Jani Luoma, Vantaa (FI); Pekka Hallikainen, Hyvinkää (FI); Raimo Pelto-Huikko, Vantaa (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 14/141,601

(22) Filed: Dec. 27, 2013

(65) Prior Publication Data

US 2014/0182975 A1    Jul. 3, 2014

(30) Foreign Application Priority Data

Dec. 30, 2012  (FI) ...................................... 20126393

(51) Int. Cl.
  *B66B 7/08*  (2006.01)
  *B66B 5/00*  (2006.01)
  (Continued)

(52) U.S. Cl.
  CPC ............. *B66B 5/0018* (2013.01); *B66B 5/0025* (2013.01); *B66B 5/0031* (2013.01);
  (Continued)

(58) Field of Classification Search
  CPC .... B66B 7/085; B66B 7/1215; B66B 7/1223; B66B 5/0087; B66B 5/0025; B66B 5/0031; D07B 2501/2007; F16G 11/04; F16G 11/042; F16G 11/048
  USPC ............ 187/391, 393, 412; 24/136 R, 115 R, 24/115 M, 135 N, 136 L IPC ................................................. D07B 1/14,1/22
See application file for complete search history.

(56) References Cited

U.S. PATENT DOCUMENTS 4,845,814 A * 7/1989 Crook ..................... F18G 11/04
                                                  24/135 R
6,357,085 B2 * 3/2002 Ericson et al. .............. 24/136 R
(Continued)

FOREIGN PATENT DOCUMENTS

CN    1184132 C    1/2005
DE    2457298 A1    6/1976
(Continued)

OTHER PUBLICATIONS

European Search Report, Sep. 4, 2014, EP 13196524, 19 Pages.

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

A rope terminal assembly of an elevator fixing an elevator rope to a fixing base such as an elevator unit, the elevator being suitable for transporting passengers and/or goods, includes an elevator rope, whose width is larger than its thickness in a rope transverse direction, with at least one end having an end face, a rope end block attached to the rope end, one or more wedge elements, a wedge housing, where the terminal assembly includes a rope gap through which the elevator rope passes and the wedge element is arranged to wedge between the rope and the wedge housing thus locking the elevator rope in the gap, and the rope end block is attached on the end face side of the elevator rope with respect to the wedge element, and an elevator.

20 Claims, 4 Drawing Sheets

(51) Int. Cl.
  *F16G 11/04* (2006.01)
  *B66B 7/06* (2006.01)
  *B66B 7/12* (2006.01)

(52) U.S. Cl.
  CPC ............... *B66B 7/085* (2013.01); *F16G 11/04* (2013.01); *F16G 11/042* (2013.01); *F16G 11/048* (2013.01); *B66B 7/062* (2013.01); *B66B 7/1223* (2013.01)

(56) References Cited

U.S. PATENT DOCUMENTS

| | | | |
|---|---|---|---|
| 6,484,368 B1* | 11/2002 | Rivera et al. | 24/115 R |
| 7,123,030 B2* | 10/2006 | Robar et al. | 324/693 |
| 7,192,185 B2* | 3/2007 | Lustenberger | 374/50 |
| 7,410,033 B2* | 8/2008 | Veronesi et al. | 187/391 |
| 7,607,204 B2* | 10/2009 | Ach | 24/136 R |
| 7,681,934 B2* | 3/2010 | Harada et al. | 294/74 |
| 8,011,479 B2* | 9/2011 | Stucky et al. | 187/393 |
| 2001/0040039 A1 | 11/2001 | De Angelis | |
| 2002/0042973 A1* | 4/2002 | Rivera et al. | 24/115 R |
| 2002/0076274 A1 | 6/2002 | Carlsen et al. | |
| 2002/0194935 A1* | 12/2002 | Clarke et al. | 73/862.391 |
| 2003/0121729 A1 | 7/2003 | Heinz et al. | |
| 2007/0181385 A1* | 8/2007 | Veronesi et al. | 187/413 |
| 2008/0149430 A1* | 6/2008 | De Angelis | 187/251 |
| 2011/0000746 A1* | 1/2011 | Pelto-Huikko et al. | 187/254 |
| 2011/0220438 A1 | 9/2011 | Annen et al. | |
| 2011/0266097 A1 | 11/2011 | Valjus et al. | |
| 2013/0270042 A1* | 10/2013 | Henneau | 187/251 |
| 2014/0182974 A1* | 7/2014 | Puranen et al. | 187/247 |

FOREIGN PATENT DOCUMENTS

| | | | |
|---|---|---|---|
| EP | 2020399 A1 | 2/2009 | |
| FR | 2 293 392 A1 | 7/1976 | |
| GB | 1401197 A | 7/1975 | |
| GB | 2255354 A | 11/1992 | |
| JP | 54122542 A * | 9/1979 | ............... B66B 7/06 |
| JP | 2009-298518 A | 12/2009 | |
| JP | 2010-204113 A | 9/2010 | |
| JP | 2011-509899 A | 3/2011 | |
| WO | WO 00/40497 A1 | 7/2000 | |
| WO | WO 2009/090299 A1 | 7/2009 | |
| WO | WO 2011/004071 A2 | 1/2011 | |
| WO | WO 2011098847 A1 * | 8/2011 | ............... B66B 7/06 |
| WO | WO 2012/030332 A1 | 3/2012 | |

* cited by examiner a) b) c)

d)

a)  b)  c)

ROPE TERMINAL ASSEMBLY AND AN ELEVATOR

FIELD OF THE INVENTION

The object of the invention is a rope terminal assembly of an elevator, the elevator being suitable for transporting passengers and/or goods, and an elevator.

BACKGROUND OF THE INVENTION

In elevator systems, elevator ropes are used for suspending and/or moving an elevator car, a counterweight or both. Elevator ropes are generally made by braiding from metallic wires or filaments and have a substantially round cross-sectional shape. A problem with metallic ropes is, due to the material properties of metal, that they have high weight and large thickness in relation to their tensile stiffness and tensile strength.

Also light-weight suspension ropes, where the width of the suspension rope for a hoisting machine is larger than its thickness in a transverse direction of the rope, are known. The rope comprises a load-bearing part made of composite materials, which composite materials comprise non-metallic reinforcing fibers in polymer matrix material. The structure and choice of material make it possible to achieve low-weight elevator ropes having a thin construction in the bending direction, a good tensile stiffness and tensile strength in longitudinal direction. In addition, the rope structure remains substantially unchanged at bending, which contributes towards a long service life.

Several arrangements have been presented to provide tools for attaching elevator ropes with the elevator units. With non-metallic elevator ropes, particularly with elevator ropes made of fiber-reinforced polymer composite materials, it is challenging to make mechanical attachment with the elevator unit without causing damage in the elevator rope. Furthermore, installation process is laborious and slow.

Development of damage detection of fibre-reinforced polymer composite materials during service life is a key problem in many practical applications of elevator technology. Many of these non-destructive tests involve the periodic inspection of composite components by means of costly equipment. There is thus a growing need for cost effective and reliable elevator rope terminal assembly with connection to rope condition monitoring means of elevator which integrate sensors allowing the in situ monitoring of damage in the rope.

BRIEF DESCRIPTION OF THE INVENTION

The object of the invention is to introduce an improved rope terminal assembly and an elevator. The object of the invention is, inter alia, to solve drawbacks of known solutions and problems discussed later in the description of the invention. It is also an object to allow a cost-effective and reliable rope terminal assembly with faster installation process. The object of the invention is to provide rope terminal assembly with improved quality of installation for the elevator rope comprising polymer composite materials.

Embodiments are presented which, inter alia, facilitate simple, safe and efficient rope terminal assembly with connection to damage detection of non-metallic load bearing parts in said elevator ropes. Also, embodiments are presented, where rope terminal assembly enables rope condition monitoring where good and safe working position and good ergonomics can be ensured. Also, embodiments are presented, where reliable in situ condition monitoring of the ropes throughout the elevator life is possible.

It is brought forward a new rope terminal assembly for non-metallic light-weight ropes of an elevator. In a preferred embodiment a rope terminal assembly of an elevator is used to fix an elevator rope to a fixing base such as an elevator unit. Said terminal assembly comprises a rope gap through which said elevator rope passes and said wedge element is arranged to wedge between said rope and said wedge housing thus locking said elevator rope in the gap, and said rope end block is attached on said end face side of the elevator rope with respect to the wedge element.

Hence also safety of the rope terminal assembly is improved. Said rope end block is used as safety means for the rope terminal assembly. If the elevator rope slips in the rope gap of said rope terminal assembly, the rope end block pushes the wedge element such that the wedge element is arranged to wedge more tightly between said rope and said wedge housing thus locking said elevator rope in the gap.

In a preferred embodiment, elevator ropes with carbon-fiber-reinforced polymer composite load bearing parts are fixed to the elevator unit with said rope terminal assembly and electrical rope condition monitoring means are connected to the rope via said rope end block of the rope terminal assembly. For unidirectional carbon-fiber-reinforced polymer composites, the longitudinal electrical resistance of unidirectional fiber is much lower than the transverse resistance, and the damage in the composite material can be detected by measuring the one or the other. Electrical resistance is a good damage sensor for carbon/epoxy laminates, especially for the detection of fiber breakage.

In a preferred embodiment the rope terminal assembly is used in elevators with counterweight, however as well being applicable in elevators without counterweight. In addition, it can also be used in conjunction with other hoisting machines, e.g. as a crane suspension and/or transmission rope. The low weight of the rope provides an advantage especially in acceleration situations, because the energy required by changes in the speed of the rope depends on its mass. The low weight further provides an advantage in rope systems requiring separate compensating ropes, because the need for compensating ropes is reduced or eliminated altogether. The low weight also allows easier handling of the ropes.

In a preferred embodiment of an elevator said rope terminal assembly according to the invention is used to fix an elevator rope to a fixing base such as the elevator unit or the end of a hoistway. The elevator has been arranged to comprise a hoistway, and an elevator unit movable in the hoistway, the elevator unit being an elevator car for transporting passengers and/or goods. The elevator arrangement may also comprise other movable elevator units such as the counterweight, as depicted. The elevator comprises lifting means comprising a lifting device, one or more suspension and/or transmission ropes, each said rope comprising one or more, preferably at least four load bearing parts, attached with the rope terminal assembly at least to one elevator unit. In a preferred embodiment each rope is guided to pass over the traction sheave rotated by the hoisting machine of the elevator and one ore more diverting pulleys. As the hoisting machine rotates, the traction sheave at the same time moves the elevator car and the counterweight in the up direction and down direction, respectively, due to friction. In addition, in high-rise buildings and in high-speed elevators there are one or more compensating ropes, each compensating rope being attached at its first end to the bottom end of the counterweight and at its second end to the bottom part of the elevator car, either to the car sling or to the car itself. The compensating rope is kept taut, e.g. by means of compensating pulleys, under which the compensating rope passes around and which pulleys are supported to a support structure on the base of the elevator hoistway. A travelling cable intended for the electricity supply of the elevator car and/or for data traffic, is attached at its first end to the elevator car, e.g. to the bottom part of the elevator car, and at its second end to a connection point on the wall of the elevator hoistway, which connection point is typically at the point of the midpoint or above the midpoint of the height direction of the elevator hoistway.

Preferably the elevator comprises rope condition monitoring means comprising a rope condition monitoring device, which monitors and transmits an electrical signal of said elevator rope, at predefined time intervals, preferably at least once per second, to an elevator controller. If an error signal is transmitted from said rope condition monitoring means to an elevator controller, the elevator operation is altered or the elevator is taken out of service. Preferably the rope condition monitoring means comprise a current source, a voltage measurement device, a microcontroller, and a display for monitoring condition of said ropes. Preferably the rope condition monitoring means is used to measure electrical resistance between said first point and second point of said elevator rope first time during elevator installation and second time when said elevator is used for transporting passenger and/or goods. Preferably said first point and second point are points of a non-metallic load bearing part of the elevator rope, or points of several electrically connected non-metallic load bearing parts of said elevator rope.

In a preferred embodiment rope end block has first part on a first side of said elevator rope and a second part on a second side of said elevator rope. Preferably the rope end block extends over said end face of said elevator rope and is a single piece structure where said first part and a second part of said rope end block are connected with a middle part of said rope end block.

Preferably rope end block is manufactured from plastics or some other electrically non-conductive material. Preferably rope end block is a single piece structure manufactured from plastics, preferably from thermoplastics polymer, for instance polyethylene, polypropylene, polystyrene or polyvinyl chloride, or thermosetting polymer, for instance polyester, polyurethanes or epoxy resins. The rope end block may be reinforced by glass, carbon or aramid fibers, and the reinforcing fibers may by short cut or they may be continuous fibers. Hence the mechanical properties, particularly specific strength and stiffness of the rope end block 3 are improved. The rope end block is preferably manufactured by extrusion, pultrusion, injection molding, blow molding, thermoforming, rotational molding, casting, foaming, compression molding or transfer molding, for instance. Thus the manufacturing of rope end block pieces is fast and the manufacturing costs are lower. Said rope end block pieces may also be manufactured from re-cycled plastics or other re-cycled materials.

Preferably rope end block comprises a first frame portion attached to said elevator rope end and a second frame portion attached to said wedge element. Preferably but not necessary rope end block comprises an elastic portion between said first and second frame portions which elastic portion allows relative movement of said first and second frame portions of said rope end block. Said elastic portion is advantageously located outside of the second frame portion of said rope end block attached to said wedge element.

Preferably rope end block is attached to said elevator rope end with fastening means. It is thus possible for the fastening means to pass through the openings in the first frame portion of the rope end block. The fastening means can advantageously be made of metal or of some other suitable electrically conductive material. The fastening means are advantageously screws or bolts with nuts. Fastening to the rope can be done by drilling bores in the rope and fastening with screws or bolts. Elasticity of said rope end block can also be arranged by sizing and designing the openings of the first frame portion of the rope end block to have an oval shape, for instance.

Preferably rope end block is attached to a wedge element with fastening means. It is thus possible for the fastening means to pass through the openings in the second frame portion of the rope end block. The fastening means can advantageously be made of metal or of some other mechanically suitable material. The fastening means are advantageously screws or bolts. The fastening to the wedge element can be done by drilling bores in the wedge element and fastening with screws or bolts.

Preferably rope end block comprises one or more short circuit elements attached to said rope end block with fastening means. It is thus possible for the fastening means to pass through the openings in the short circuit elements. The short circuit elements as well as the fastening means are advantageously made of metal or of some other suitable electrically conductive material. The fastening means are advantageously screws or bolts. The fastening to the rope is done by drilling bores in the rope and fastening with screws or bolts. The fastening means for attaching short circuit elements are advantageously the same screws or bolts used to attach the rope end block to the rope. Preferably said short circuit elements are metallic short circuit plates.

In a preferred embodiment, a rope terminal assembly of an elevator comprises an elevator rope, whose width is larger than its thickness in a rope transverse direction, with at least one end having an end face, a rope end block attached to the rope end, two wedge elements, and a wedge housing. The rope terminal assembly comprises a rope gap through which said elevator rope passes and said wedge element is arranged to wedge between said rope and said wedge housing, preferably between said rope and the support sides of said wedge housing, thus locking said elevator rope in the gap, and said rope end block is attached on said end face side of the elevator rope with respect to the wedge element.

Preferably said wedge element is an elongated element comprising a smooth contact surface portion and a rough or patterned contact surface portion, said smooth contact surface portion being arranged against said wedge housing element and said rough or patterned contact surface being arranged against said elevator rope surface. The wedge element also comprises a space for the rope end block at the first end of the wedge element. It is thus possible for the fastening means of the rope end block to be attached to the space of the wedge element. The space for the rope end block is advantageously on the rough or patterned contact surface portion side of the first end of the wedge element and comprises a threaded opening for the fastening means. The wedge element is advantageously made of metal or of some other mechanically suitable material.

Preferably said wedge housing comprises two elongated side elements and two elongated wedge support elements, said side elements and said wedge support elements being attached together preferably by welding or by gluing, for instance, the side and wedge support elements together. The side elements comprise hollows and the wedge support elements comprise plugs or vice versa on their sides that fit together for placing the sides together. Preferably said wedge housing element comprises one or more adjustable locking means which are arranged to lock said wedge elements in its position in said wedge housing. It is possible for the locking means to pass through the openings in the wedge housing support elements. The wedge housing side elements as well as the support elements are advantageously made of metal or of some other mechanically suitable material. The locking means are advantageously screws or bolts. Locking of the wedge elements is done by fastening with screws or bolts. Said rope terminal assembly is fixed to said fixing base with a fixing rod being fixed to said wedge housing side elements with fixing means. It is possible for the fixing means of the fixing rod to pass through the openings in the wedge housing side elements.

In a preferred embodiment of the rope terminal assembly of an elevator the light-weight rope comprises one or more, preferably at least four unidirectional carbon fiber-reinforced-polymer load-bearing parts covered with polyurethane coating. In case of four load-bearing parts, the rope is electrically modeled as four resistors. Preferred solution is to measure one rope as a single resistance. In that way measuring arrangements are kept simple and the method is also more reliable, because the number of wires and connections is minimized. With this method simple and reliable solutions to short-circuit carbon fiber-reinforced-polymer load-bearing parts, and to connect the measuring wires to the rope, preferably by self-tapping screws screwed between the load-bearing parts in such a way, that the screw acts as an electrically conductive path between adjacent load-bearing parts, are used. At the counterweight end of said rope, preferably three screws are used to short-circuit all of the strands. At the car end of said rope, preferably two outermost load-bearing parts are connected together, and measuring wires are inserted under these two screws with a split ring connector. With this arrangement, all carbon fiber-reinforced-polymer load-bearing parts are monitored and the whole rope is seen as a single resistor.

In a preferred embodiment electrical resistance between a first point and a second point of elevator suspension and/or transmission rope is measured first time, and thereafter a threshold value is determined based on the measurement, and thereafter the elevator is used for transporting passengers and/or goods, and thereafter electrical resistance between the first point and the second point of said suspension and/or transmission ropes is measured second time, and thereafter results of said second time measurement are compared with said threshold value, and if said second time measurement meets said threshold value, predetermined actions are carried out.

In an embodiment of a rope terminal assembly, an elevator is used to fix an elevator rope to a fixing base such as an elevator unit, which assembly comprises: an elevator rope, whose width is larger than its thickness in a rope transverse direction, with at least one end having an end face, a rope end block attached to the rope end, one wedge element, and a wedge housing. The rope terminal assembly comprises a rope gap through which said elevator rope passes and said wedge element is arranged to wedge between said rope and said wedge housing, preferably between said rope and the support side of said wedge housing, thus locking said elevator rope in the gap, and said rope end block is attached on said end face side of the elevator rope with respect to the wedge element.

In a preferred embodiment of the invention, at least one rope, but preferably a number of suspension and/or transmission ropes is constructed such that the width of the rope is larger than its thickness in a transverse direction of the rope and fitted to support and move an elevator car, said rope comprising a load-bearing part made of composite material, which composite material comprises reinforcing fibers, which preferably consist of unidirectional carbon fiber, in a polymer matrix. The suspension rope is most preferably secured by one end to the elevator car and by the other end to a counterweight, but it is applicable for use in elevators without counterweight as well. Although the figures only show elevators with a 1:1 suspension ratio, the rope described is also applicable for use as a suspension rope in an elevator with a 1:2 suspension ratio. The rope is particularly well suited for use as a suspension rope in an elevator having a large lifting height, preferably an elevator having a lifting height of over 100 meters, most preferably 150-800 meters. The rope defined can also be used to implement a new elevator without a compensating rope, or to convert an old elevator into one without a compensating rope.

It is obvious to a person skilled in the art that the invention is not exclusively limited to the embodiments described above, in which the invention has been described by way of example, but that many variations and different embodiments of the invention are possible within the scope of the inventive concept defined in the claims presented below. Thus it is obvious that the ropes described may be provided with a cogged surface or some other type of patterned surface to produce a positive contact with the traction sheave. It is also obvious that the rectangular composite load-bearing parts may comprise edges more starkly rounded than those illustrated or edges not rounded at all. Similarly, the polymer layer of the ropes may comprise edges/corners more starkly rounded than those illustrated or edges/corners not rounded at all. It is likewise obvious that the load-bearing part/parts in the embodiments can be arranged to cover most of the cross-section of the rope. In this case, the sheath-like polymer layer surrounding the load-bearing part/parts is made thinner as compared to the thickness of the load-bearing part, in the thickness-wise direction of the rope. It is likewise obvious that, in conjunction with the solutions represented, it is possible to use belts of other types than those presented. It is likewise obvious that both carbon fiber and glass fiber can be used in the same composite part if necessary. It is likewise obvious that the thickness of the polymer layer may be different from that described. It is likewise obvious that the shear-resistant part could be used as an additional component with any other rope structure showed in this application. It is likewise obvious that the matrix polymer in which the reinforcing fibers are distributed may comprise—mixed in the basic matrix polymer, such as e.g. epoxy—auxiliary materials, such as e.g. reinforcements, fillers, colors, fire retardants, stabilizers or corresponding agents. It is likewise obvious that, although the polymer matrix preferably does not consist of elastomer, the invention can also be utilized using an elastomer matrix. It is also obvious that the fibers need not necessarily be round in cross-section, but they may have some other cross-sectional shape. It is further obvious that auxiliary materials, such as e.g. reinforcements, fillers, colors, fire retardants, stabilizers or corresponding agents, may be mixed in the basic polymer of the layer, e.g. in polyurethane. It is likewise obvious that the invention can also be applied in elevators designed for hoisting heights other than those considered above.

The elevator as describe anywhere above is preferably, but not necessarily, installed inside a building. The car is preferably traveling vertically. The car is preferably arranged to serve two or more landings. The car preferably responds to calls from landing and/or destination commands from inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

DETAILED DESCRIPTION

Figure 1:
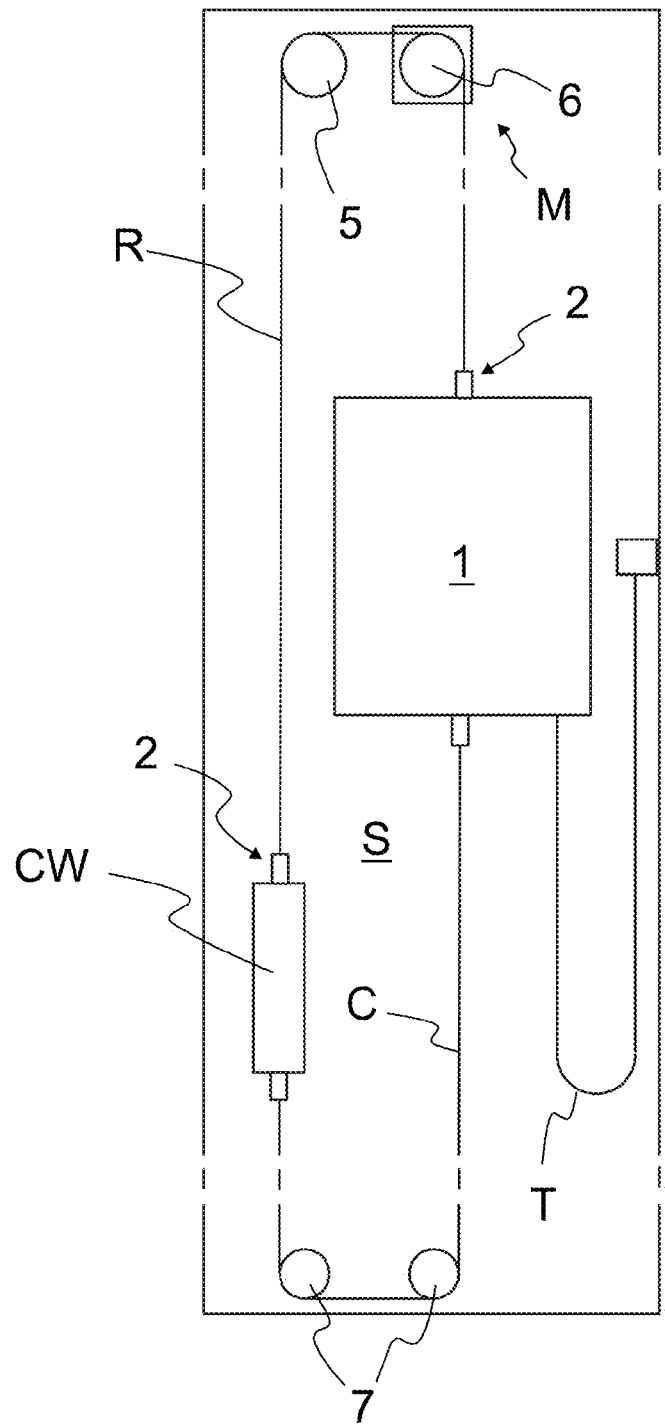
FIG. 1 illustrates schematically an elevator according to an embodiment of the invention.
Figure 2:
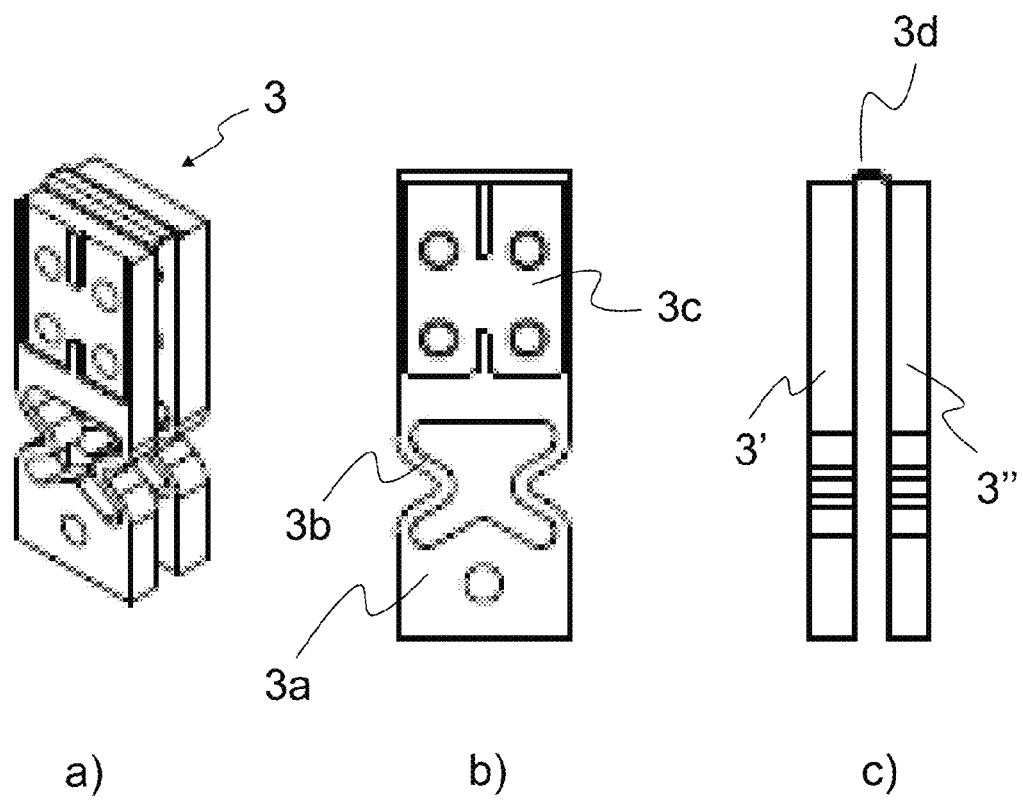
FIG. 2a illustrates a preferred embodiment of the rope end block.
FIG. 2b illustrates a first side view of a preferred embodiment of the rope end block.
FIG. 2c illustrates a second side view of a preferred embodiment of the rope end block.
FIG. 2d illustrates a preferred embodiment of the rope end block.
Figure 2:
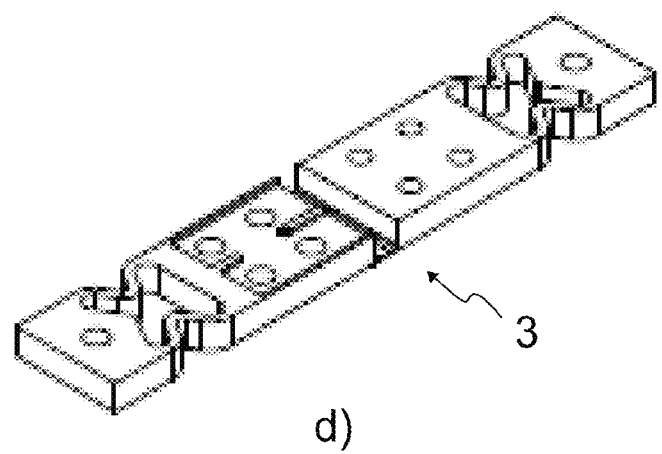

In FIG. 1 it is illustrated a preferred embodiment of an elevator where the elevator rope R, C is connected to the elevator unit 1, CW with a rope terminal assembly 2 according to the invention. The elevator has been arranged to comprise a hoistway S, and an elevator unit 1 movable in the hoistway S, the elevator unit being an elevator car 1 for transporting passengers and/or goods. The elevator arrangement may also comprise other movable elevator units such as the counterweight CW, as depicted. The elevator comprises lifting means comprising a lifting device M, roping comprising one or more suspension and transmission ropes R, each said rope R comprising one or more, preferably at least four load bearing parts 12a, 12b, 12c, 12d, attached with the rope terminal assembly 2 at least to one elevator unit 1, CW. Each rope R is guided to pass over the traction sheave 6 rotated by the hoisting machine M of the elevator and one ore more diverting pulleys 5. As the hoisting machine M rotates, the traction sheave 6 at the same time moves the elevator car 1 and the counterweight CW in the up direction and down direction, respectively, due to friction. In addition, in high-rise buildings and in high-speed elevators there is a second roping comprising one or more a compensating ropes C, each compensating rope C being suspended to hang at its first end to the bottom end of the counterweight CW and at its second end to the bottom part of the elevator car 1, either to the car sling or to the car itself. The compensating rope C is kept taut, e.g. by means of compensating pulleys 7, under which the compensating rope C passes around and which pulleys 7 are connected to a support structure on the base of the elevator hoistway S, which support structure is not, however, shown in the figure. A travelling cable T intended for the electricity supply of the elevator car and/or for data traffic, is suspended to hang at its first end to the elevator car 1, e.g. to the bottom part of the elevator car 1, and at its second end to a connection point on the wall of the elevator hoistway S, which connection point is typically at the point of the midpoint or above the midpoint of the height direction of the elevator hoistway S.

The elevator comprises rope condition monitoring means comprising a rope condition monitoring device, which monitors and transmits an electrical signal of said elevator rope R, C, at predefined time intervals, preferably at least once per second, to an elevator controller. If an error signal is transmitted from said rope condition monitoring means to an elevator controller, the elevator operation is altered or the elevator is taken out of service. Preferably the rope condition monitoring means is used to measure electrical resistance between a first point and a second point of said elevator rope R, C first time during elevator installation and second time when said elevator is used for transporting passenger and/or goods. Preferably said first point and second point are points of a non-metallic load bearing part 12a, 12b, 12c, 12d of the elevator rope R, C, or points of several electrically connected non-metallic load bearing parts 12a, 12b, 12c, 12d of said elevator rope R, C.

FIG. 2a, FIG. 2b, FIG. 2c, and FIG. 2d illustrate a preferred embodiment of the rope end block 3 having first part 3' on a first side of said elevator rope and a second part 3" on a second side of said elevator rope. Preferably the rope end block 3 extends over said end face R' of said elevator rope. Rope end block 3 is a single piece structure where said first part 3' and a second part 3" of said rope end block 3 are connected with a middle part 3d of said rope end block 3.

Rope end block 3 is manufactured from plastics or some other electrically non-conductive material. Preferably rope end block 3 is a single piece structure manufactured from plastics, preferably from thermoplastics polymer or thermosetting polymer. The rope end block 3 may be reinforced by non-metallic reinforcing fibers short cut or they may be continuous fibers. Hence the mechanical properties, particularly specific strength and stiffness of the rope end block 3 are improved. The rope end block 3 is preferably manufactured by extrusion, pultrusion, injection molding, blow molding, thermoforming, rotational molding, casting, foaming, compression molding or transfer molding, for instance. Thus the manufacturing of rope end block 3 pieces is fast and the manufacturing costs are lower. Said rope end block 3 pieces may also be manufactured from re-cycled plastics or other re-cycled materials.

Preferably rope end block 3 comprises a first frame portion 3c attached to said elevator rope end and a second frame portion 3a attached to said wedge element 8, 8'. Preferably but not necessary rope end block 3 comprises an elastic portion 3b between said first and second frame portions which elastic portion 3b allows relative movement of said first and second frame portions of said rope end block 3. Said elastic portion 3b is advantageously located outside of the second frame portion 3a of said rope end block 3 attached to said wedge element 8, 8'.

Preferably rope end block 3 is attached to said elevator rope R end with fastening means. It is thus possible for the fastening means to pass through the openings in the first frame portion 3c of the rope end block 3. The fastening means can advantageously be made of metal or of some other suitable electrically conductive material. The fastening means are advantageously screws or bolts with nuts. The fastening to the rope can be done by drilling bores in the rope and fastening with screws or bolts. Elasticity of said rope end block 3 can also be arranged by sizing and designing the openings of the first frame portion 3c of the rope end block 3 to have an oval shape, for instance.

Said rope end block 3 is attached to a wedge element 8, 8' with fastening means 10, 10'. It is thus possible for the fastening means 10, 10' to pass through the openings in the second frame portion 3a of the rope end block 3. The fastening means 10, 10' can advantageously be made of metal or of some other mechanically suitable material. The fastening means 10, 10' are advantageously screws or bolts. Fastening to the wedge element can be done by drilling bores in the wedge element 8, 8' and fastening with screws or bolts. In a preferred embodiment said rope end block 3 comprises one or more short circuit elements attached to said rope end block 3 with fastening means. It is thus possible for the fastening means to pass through the openings in the short circuit elements. The short circuit elements such as short circuit plates as well as the fastening means are advantageously made of metal or of some other suitable electrically conductive material. The fastening means are advantageously screws or bolts. The fastening to the rope is done by drilling bores in the rope and fastening with screws or bolts. The fastening means for attaching short circuit elements are advantageously the same screws or bolts used to attach the rope end block 3 to the rope.

FIG. 3a and FIG. 3b illustrates a preferred embodiment of the rope terminal assembly 2 with two wedge elements 8, 8' and FIG. 3c illustrates a preferred embodiment of the rope terminal assembly 2 wedge housing 4. A preferred embodiment of a rope terminal assembly 2 of an elevator fixing an elevator rope R to a fixing base such as an elevator unit 1, CW, comprises an elevator rope R, whose width is larger than its thickness in a rope transverse direction, with at least one end having an end face R', a rope end block 3 attached to the rope end, two wedge elements 8, 8', a wedge housing 4. The rope terminal assembly 2 comprises a rope gap through which said elevator rope R passes and said wedge element 8, 8' is arranged to wedge between said rope R and said wedge housing 4, preferably between said rope R and the support sides 4b, 4b' of said wedge housing 4, thus locking said elevator rope in the gap, and said rope end block 3 is attached on said end face side R' of the elevator rope R with respect to the wedge element 8, 8'.

Preferably said wedge element 8, 8' is an elongated element comprising a smooth contact surface portion 8b, 8b' and a rough or patterned contact surface portion 8a, 8a', said smooth contact surface portion 8b, 8b' being arranged against said wedge housing 4 and said rough or patterned contact surface 8a, 8a' being arranged against said elevator rope R surface. The wedge element 8, 8' also comprises a space for the rope end block 3 at the first end of the wedge element 8, 8'. It is thus possible for the fastening means 10, 10' of the rope end block 3 to be attached to the space of the wedge element 8, 8'. The space for the rope end block 3 is advantageously on the rough or patterned contact surface portion 8a, 8a' side of the first end of the wedge element 8, 8' and comprises a threaded opening for the fastening means. The wedge element 8, 8' is advantageously made of metal or of some other mechanically suitable material.

Said wedge housing 4 comprises two elongated side elements 4a, 4a' and two elongated wedge support elements 4b, 4b', said side elements 4a, 4a' and said wedge support elements 4b, 4b' being attached together by welding or by gluing the side and wedge support elements together. The side elements 4a, 4a' comprise hollows and the wedge support elements 4b, 4b' comprise plugs on their sides that fit together for placing the sides together. Preferably said wedge housing 4 comprises one or more adjustable locking means 9, 9' which are arranged to lock said wedge elements 8, 8' in its position in said wedge housing element 4. It is possible for the locking means 9, 9' to pass through the openings in the support elements 4b, 4b' of the wedge housing element 4. The wedge housing side elements 4a, 4a' as well as the support elements 4b, 4b' are advantageously made of metal or of some other mechanically suitable material. The locking means 9, 9' are advantageously screws or bolts. Locking of the wedge elements is done by fastening with screws or bolts. Said rope terminal assembly 2 is fixed to said fixing base with a fixing rod 11 being fixed to said side elements 4a, 4a' with fixing means. It is possible for the fixing means of the fixing rod 11 to pass through the openings in the side elements 4a, 4a' of the wedge housing 4.

Figure 4:
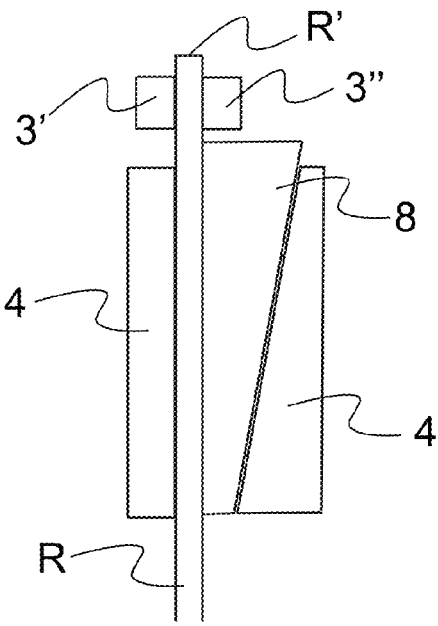
FIG. 4 illustrates schematically an embodiment of the rope terminal assembly with one wedge element.

FIG. 4 illustrates schematically an embodiment of a rope terminal assembly of an elevator attaching an elevator rope R to an elevator unit, which assembly comprises an elevator rope R, whose width is larger than its thickness in a rope transverse direction, with at least one end having an end face R', a rope end block 3 attached to the rope end R', one wedge element 8, and a wedge housing 4. The rope terminal assembly 2 comprises a rope gap through which said elevator rope R passes and said wedge element 8 is arranged to wedge between said rope R and said wedge housing 4, preferably between said rope R and the support side of said wedge housing 4, thus locking said elevator rope R in the gap, and said rope end block 3 is attached on said end face side R' of the elevator rope R with respect to the wedge element 8. It is obvious that said wedge housing 4 can be constructed as a single piece structure, a two piece structure, a three piece structure or a structure being constructed from several elements that form said rope gap for the rope and support for one or more wedge elements.

Figure 3:
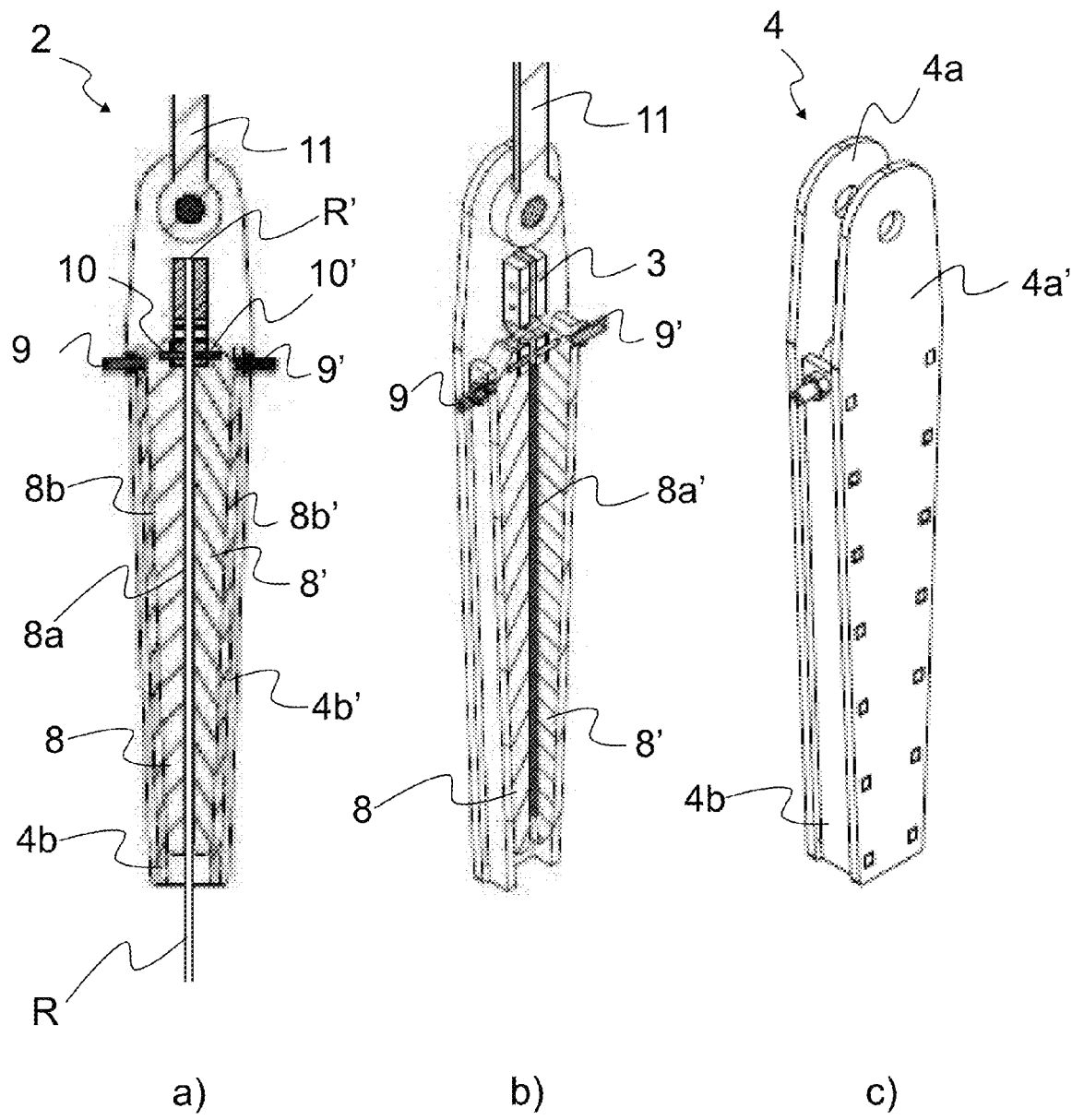
FIG. 3a illustrates a side view of a preferred embodiment of the rope terminal assembly with two wedge elements.
FIG. 3b illustrates a preferred embodiment of the rope terminal assembly with two wedge elements.
FIG. 3c illustrates a preferred embodiment of the rope terminal assembly wedge housing.
Figure 5:
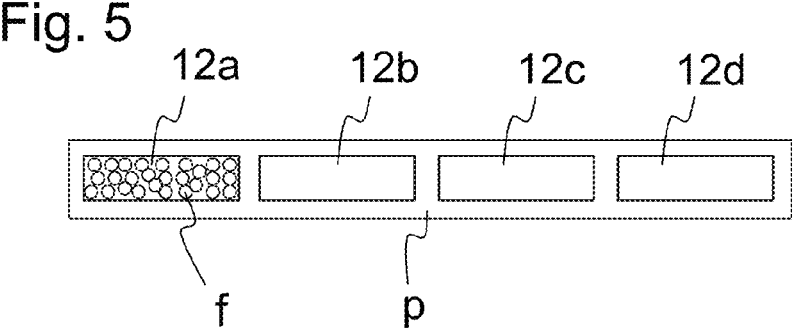
FIG. 5 illustrates schematically a cross section of an embodiment of an elevator rope.

FIG. 5 illustrates a preferred embodiment of a rope R cross section as described in connection with one of FIGS. 1, 3, and 4 used as a suspension and/or transmission rope R of an elevator, particularly a passenger elevator. In the use according to the invention, at least one rope R, but preferably a number of ropes R is constructed such that the width of the rope is larger than its thickness in a transverse direction of the rope R and fitted to support and move an elevator car, said rope R comprising a load-bearing part 12a, 12b, 12c, 12d made of composite material, which composite material comprises reinforcing fibers f, which consist of untwisted unidirectional carbon fibers, in a polymer matrix oriented in the lengthwise direction of the rope. The suspension rope R is most preferably secured by one end to the elevator car 1 and by the other end to a counterweight CW, but it is applicable for use in elevators without counterweight as well. Although the figures only show elevators with a 1:1 suspension ratio, the rope R described is also applicable for use as a suspension rope R in an elevator with a 1:2 suspension ratio. The rope R is particularly well suited for use as a suspension and transmission rope R in an elevator having a large lifting height, preferably an elevator having a lifting height of over 100 meters, most preferably 150-800 meters. The rope R defined can also be used to implement a new elevator without a compensating rope C, or to convert an old elevator into one without a compensating rope C.

Figure 6:
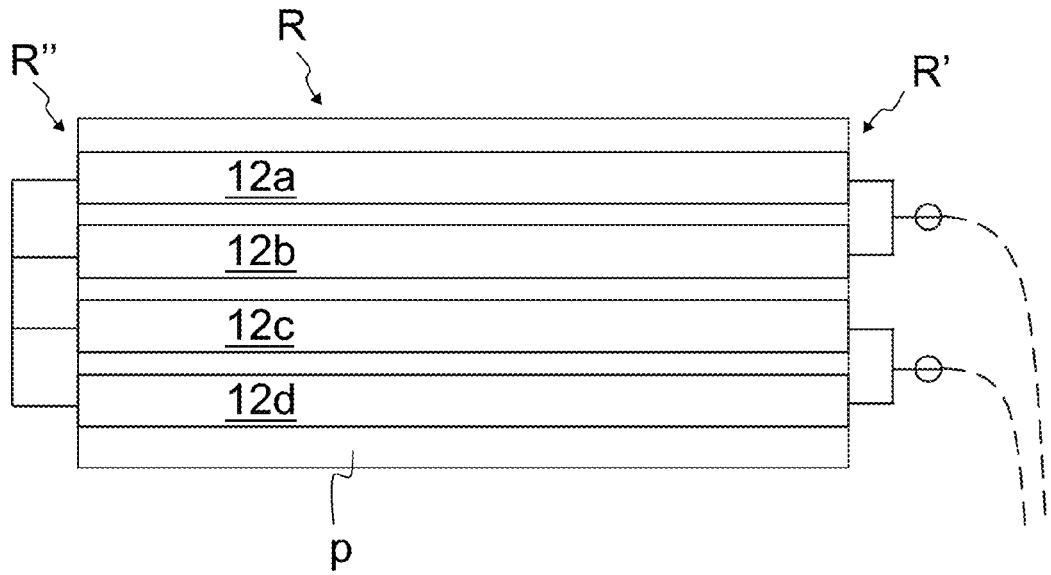
FIG. 6 illustrates an electrical model of the elevator rope condition monitoring arrangement connected to the rope terminal assembly via the rope end block.

FIG. 6 illustrates a preferred embodiment of an electrical model of the elevator rope condition monitoring arrangement, especially for the rope R part of said rope condition monitoring means, connected to the rope R via the rope end block 3 of the rope terminal assembly 2. In a preferred embodiment of the rope condition monitoring arrangement the elevator comprises a light-weight rope R comprising one or more, preferably at least four unidirectional carbon fiber-reinforced-polymer load-bearing parts 12a, 12b, 12c, 12d as shown in FIG. 6 covered with polyurethane coating p. In case of four load-bearing parts 12a, 12b, 12c, 12d as shown in FIG. 6, the rope R is electrically modeled as four resistors. Preferred solution is to measure one rope R as a single resistance.

In that way measuring arrangements are kept simple and the method is also more reliable, because the number of wires and connections is minimized. With this method simple and reliable solutions to short-circuit carbon fiber-reinforced-polymer load-bearing parts 12a, 12b, 12c, 12d, and to connect the measuring wires to the rope R, preferably by self-tapping screws screwed between the load-bearing parts 12a, 12b, 12c, 12d in such a way, that the screw acts as an electrically conductive path between adjacent load-bearing parts 12a, 12b, 12c, 12d, are used. At the counterweight end R" of said rope R, preferably three screws are used to short-circuit all of the strands. At the car end R' of said rope R, preferably two outermost load-bearing parts are connected together, and measuring wires are inserted under these two screws with a split ring connector. With this arrangement, all carbon fiber-reinforced-polymer load-bearing parts 12a, 12b, 12c, 12d are monitored and the whole rope is seen as a single resistor.

It is obvious to a person skilled in the art that the invention is not exclusively limited to the embodiments described above, in which the invention has been described by way of example, but that many variations and different embodiments of the invention are possible within the scope of the inventive concept defined in the claims presented below. Thus it is obvious that the ropes R described may be provided with a cogged surface or some other type of patterned surface to produce a positive contact with the traction sheave 6. It is also obvious that the rectangular composite load-bearing parts 12a, 12b, 12c, 12d electrically modeled as resistors may comprise edges more starkly rounded than those illustrated or edges not rounded at all. Similarly, the polymer layer 10 of the ropes R may comprise edges/corners more starkly rounded than those illustrated or edges/corners not rounded at all. It is likewise obvious that the load-bearing part/parts 12a, 12b, 12c, 12d in the embodiments can be arranged to cover most of the cross-section of the rope R. In this case, the sheath-like polymer layer 10 surrounding the load-bearing part/parts 12a, 12b, 12c, 12d, is made thinner as compared to the thickness of the load-bearing part 12a, 12b, 12c, 12d, in the thickness-wise direction of the rope R. It is likewise obvious that, in conjunction with the solutions represented by figures, it is possible to use belts of other types than those presented. It is likewise obvious that both carbon fiber and glass fiber can be used in the same composite part if necessary. It is likewise obvious that the thickness of the polymer p layer may be different from that described. It is likewise obvious that the shear-resistant part could be used as an additional component with any other rope structure showed in this application. It is likewise obvious that the matrix polymer in which the reinforcing fibers f are distributed may comprise—mixed in the basic matrix polymer, such as e.g. epoxy—auxiliary materials, such as e.g. reinforcements, fillers, colors, fire retardants, stabilizers or corresponding agents. It is likewise obvious that, although the polymer matrix preferably does not consist of elastomer, the invention can also be utilized using an elastomer matrix. It is also obvious that the fibers f need not necessarily be round in cross-section, but they may have some other cross-sectional shape. It is further obvious that auxiliary materials, such as e.g. reinforcements, fillers, colors, fire retardants, stabilizers or corresponding agents, may be mixed in the basic polymer of the layer p, e.g. in polyurethane. It is likewise obvious that the invention can also be applied in elevators designed for hoisting heights other than those considered above.

It is to be understood that the above description and the accompanying figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A rope terminal assembly of an elevator, which assembly fixes an elevator rope to a fixing base and which elevator rope has a width that is larger than its thickness in a rope transverse direction, with at least one end of the elevator rope having an end face, and said elevator being suitable for transporting passengers and/or goods, wherein said terminal assembly comprises:
   a rope end block for attachment to the at least one end of the elevator rope,
   one or more wedge elements, and
   a wedge housing,
   wherein said terminal assembly comprises a rope gap through which said elevator rope is to pass, when said elevator rope is attached to said terminal assembly, and said wedge element is arranged to wedge between said elevator rope and said wedge housing, thus locking said elevator rope in the rope gap, the wedge element contacting both the wedge housing and the elevator rope due to insertion between the wedge housing and the elevator rope, said rope end block is attached on said at least one end of the elevator rope with respect to the wedge element, and said rope end block is made of plastics or electrically non-conductive material,
   wherein each wedge element has a first surface contacting the rope and a second surface contacting the housing, the first surface being opposite to the second surface, and
   wherein said rope end block is attached to said wedge element with one or more fasteners.

2. The rope terminal assembly according to claim 1, wherein said rope end block has a first part on a first side of said elevator rope and a second part on a second side of said elevator rope.

3. The rope terminal assembly according to claim 2, wherein said rope end block is a single piece structure where said first part and said second part of said rope end block are connected with a middle part.

4. Elevator suitable for transporting passengers and/or goods, which elevator comprises:
   a hoistway,
   at least one elevator unit movable in the hoistway, said at least one elevator unit including at least an elevator car,
   lifting means comprising a lifting device and one or more elevator ropes connected to said at least one elevator unit, and
   the rope terminal assembly according to claim 1,
   wherein said elevator rope is fixed to the fixing base.

5. The elevator according to claim 4, wherein elevator comprises rope condition monitoring means which is used to measure electrical resistance between said first point and second point of said elevator rope at a first time during elevator installation and at a second time when said elevator has been used for transporting passenger and/or goods.

6. The elevator according to claim 5, wherein said first point and second point are points of a non-metallic load bearing part of the elevator rope, or points of several electrically connected non-metallic load bearing parts of said elevator rope.

7. The elevator according to claim 4, wherein said elevator comprises rope condition monitoring means connected via said rope end block to load bearing parts of said elevator rope.

8. The elevator according to claim 4, wherein said elevator comprises rope condition monitoring means and if an error signal is transmitted from said rope condition monitoring means to an elevator controller, the elevator operation is altered or the elevator is taken out of service.

9. The elevator according to claim 4, wherein said elevator rope comprises load bearing parts made of fiber-reinforced polymer matrix composite material.

10. The rope terminal assembly according to claim 1, wherein said wedge element is an elongated element comprising a smooth contact surface portion and a rough or patterned contact surface portion, said smooth contact surface portion is arranged against said wedge housing and said rough or patterned contact surface is arranged against a surface of the elevator rope.

11. The rope terminal assembly according to claim 1, wherein said wedge housing comprises two elongated side elements and two elongated wedge support elements, and said side elements and said wedge support elements are connected together to form the rope gap in said wedge housing.

12. The rope terminal assembly according to claim 1, wherein said wedge housing comprises one or more adjustable locking means which are arranged to lock said wedge element in position in said wedge housing.

13. The rope terminal assembly according claim 1, wherein said rope end block extends over said end face of said elevator rope.

14. The rope terminal assembly according to claim 1, wherein said rope end block is attached to said elevator rope end with one or more fasteners.

15. The rope terminal assembly according to claim 1, wherein said rope end block comprises a first frame portion attached to said elevator rope end and a second frame portion attached to said wedge element, and an elastic portion between said first and second frame portions which elastic portion allows relative movement of said first and second frame portions of said rope end block.

16. The rope terminal assembly according to claim 1, wherein said rope end block comprises an elastic portion which is located outside of a frame portion of said rope end block attached to said wedge element.

17. The rope terminal assembly according to claim 1, wherein said elevator rope is electrically connected to a rope condition monitoring means via said rope end block comprising one or more electrically conductive short circuit elements and one or more fasteners.

18. The rope terminal assembly according to claim 1, wherein said elevator rope is made of carbon-fiber-reinforced polymer composite material.

19. The rope terminal assembly according to claim 1, wherein said elevator rope comprises carbon-fiber-reinforced polymer load bearing parts to which rope condition monitoring means are connected with electrically conductive fasteners.

20. A rope terminal assembly of an elevator, which assembly fixes an elevator rope to a fixing base and which elevator rope has a width that is larger than its thickness in a rope transverse direction, with at least one end of the elevator rope having an end face, and said elevator being suitable for transporting passengers and/or goods, wherein said terminal assembly comprises:
  a rope end block for attachment to the at least one end of the elevator rope,
  one or more wedge elements, and
  a wedge housing,
  wherein said terminal assembly comprises a rope gap through which said elevator rope is to pass, when said elevator rope is attached to said terminal assembly, and said wedge element is arranged to wedge between said elevator rope and said wedge housing, thus locking said elevator rope in the rope gap, the wedge element contacting both the wedge housing and the elevator rope due to insertion between the wedge housing and the elevator rope, said rope end block is attached on said at least one end of the elevator rope with respect to the wedge element, and said rope end block is made of plastics or electrically non-conductive material,
  wherein the rope passes through a bottom portion of the wedge housing and terminates near a top portion of the wedge housing,
  wherein the rope extends in a rectilinear direction between the top portion and the bottom portion of the wedge housing by passing by a side of the at least one wedge element, and
  wherein said rope end block is attached to said wedge element with one or more fasteners.

* * * * *